Aug. 23, 1938.  M. PLÖN  2,127,886

STICK HANDLED APPLIANCE FOR THE CARE OF FLOORS AND STAIRS

Filed July 30, 1937

Inventor,
Max Plön
By C. F. Wendiroth
Atty

Patented Aug. 23, 1938

2,127,886

UNITED STATES PATENT OFFICE 2,127,886

STICK-HANDLED APPLIANCE FOR THE CARE OF FLOORS AND STAIRS

Max Plön, Basel, Switzerland

Application July 30, 1937, Serial No. 156,594
In Switzerland December 24, 1936

7 Claims. (Cl. 15—231)

The present invention relates to a stick-handled appliance for the care (mopping, cleaning, waxing or the like) of floors and stairs, which is characterized by the fact that while the stick is attached by means of a removable stick fastening plate to the body of the appliance, the latter is provided on its upper side with a handle which protrudes through a slot in the stick fastening plate and at the same time forms part of a fastening device which provides an easily releasable attachment of the stick fastening plate to the body of the appliance, and which when released permits the removal of the stick fastening plate and the use of the appliance by means of the said grasp handle.

The appliance according to the invention is advantageously provided with means enabling a cloth wrapped round the body of the appliance to be held when the appliance is used by means of the handle. These means comprise, in a practical embodiment of the appliance according to the invention, a cloth holding plate separate from the appliance, which is so constructed that after the stick fastening plate has been removed, it can be secured to the body of the appliance by the above mentioned fastening device, in order to hold the cloth in its working position by clamping the ends of the cloth wrapped over the body of the appliance.

An example embodying the invention is illustrated in the accompanying drawing.

Figure 6:
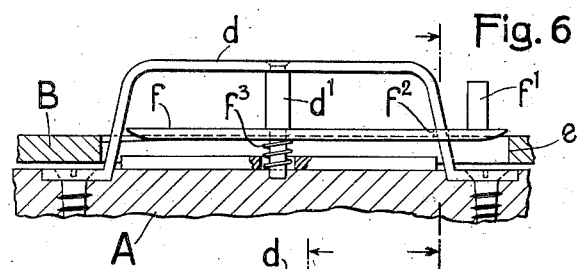
Figures 6 and 7 are sections on an enlarged scale, to show certain details of the appliance more clearly.

The illustrated appliance has a body A provided with brush tufts $a$ (Figure 1) serving for cleaning and polishing, and with a fastening plate B having a stirrup $c$ receiving the stick $b$ hinged thereto, said plate serving for attaching the stick to the body A. The body A is provided on its upper side with a bow shaped handle $d$ (Figure 6) which projects through a longitudinal slot $e$ in the plate B and forms part of a fastening device by means of which an easily releasable attachment of the plate B to the body A is effected.

Figure 2:
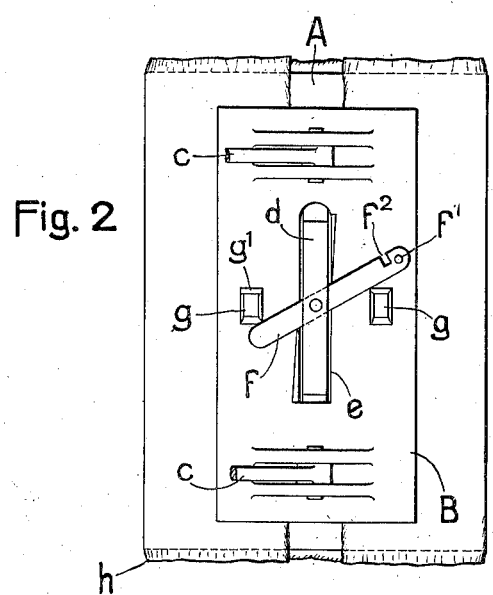
Figure 2 is a plan of Figure 1 with the stick holding stirrup broken off.
Figure 7:
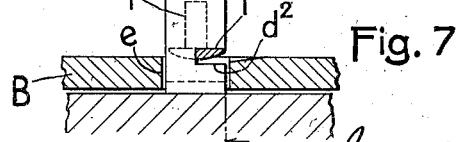

This fastening device comprises a bearing pin $d^1$ secured at one end in the middle cross part of the bow shaped handle $d$ and projecting at its other end into the body A, upon the lower reduced diameter part of which pin a double armed locking lever $f$ with unequal arms, is pivoted. The longer arm of this lever $f$ is provided at its outer end with an upwardly projecting operating pin $f^1$. In its turned or working position, the lever $f$ is transverse to the slot $e$ in the plate B and exerts with both arms, counter to the action of a helical spring $f^3$, a pressure on the plate, the shoulder formed by the larger diameter part of the pin $d^1$ serving as an abutment, and the lever thus holds the plate B firmly locked on the body A. As Figure 2 particularly shows, the longer arm of the lever $f$ has a notch $f^2$ so that the lever can be swung exactly over the slot $e$ in the plate B, the notch $f^2$ then engaging in a cooperating notch $d^2$ (Figure 7) in the corresponding limb part of the handle $d$ (see Figure 6). In this position of rest of the lever $f$ the stick fastening plate B can be directly lifted off the body A, so that the latter, by taking hold of the handle $d$, can be used as a hand appliance, for example for cleaning and care of stairs, as illustrated in Figure 4.

Figure 1:
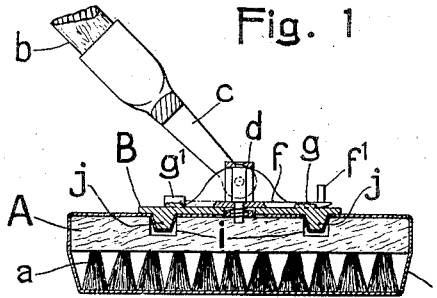
Figure 1 is a cross section of the appliance.

If the appliance with the stick $b$ attached is to be used for mopping, a mop cloth $h$ is wrapped round the body A in the manner shown in Figure 1. In order to hold the cloth in its position of use, the upper side of the body A is provided with two longitudinal grooves $i$ in which two downwardly slightly tapering longitudinal ribs $j$ correspondingly arranged on the underside of the plate B (Figure 7) engage, so that the wrapped over ends of the cloth $h$ are firmly clamped in the grooves $i$. The arrangement just described also has the advantage moreover of producing a firmer fastening between the plate B and body A. In order to enable the plate B to be firmly pressed upon and locked to the body A without the use of the cloth $h$, two wedge projections $g$ (Figure 2) are provided on the upper side of the plate B, on which the two arms of the lever $f$ bear in the position of the lever at 90° to the slot $e$, and one of which is provided with an abutment rib $g^1$ limiting the swinging movement of the locking lever $f$.

Figure 4:
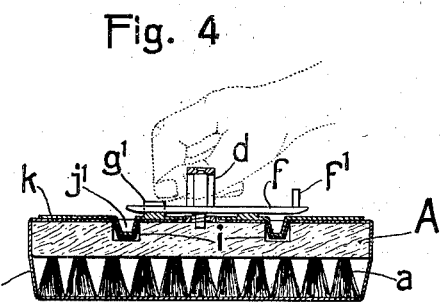
Figure 4 is, similarly to Figure 1, a cross section of the appliance, but in another condition of use.
Figure 5:
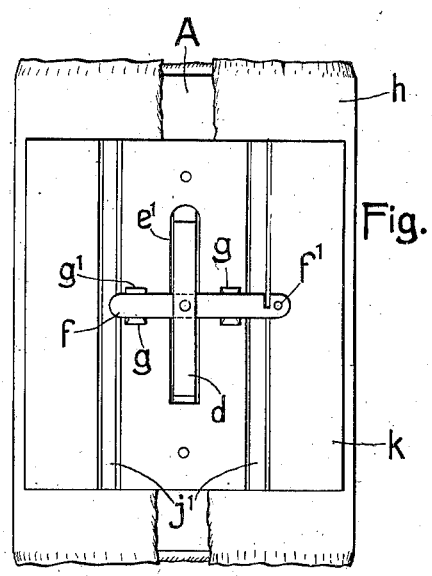
Figure 5 is a plan view of Figure 4.
Figure 3:
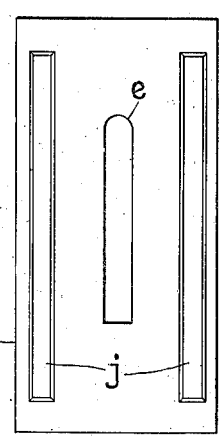
Figure 3 is a view of the bottom of the stick fastening plate.

In order to enable the cloth $h$ also to be secured in its working position on the body A when the appliance is used by the handle $d$, the appliance is fitted with an auxiliary cloth holding plate $k$ provided with a longitudinal slot $e^1$, which plate is shown in position on the body A in Figures 4 and 5. This plate $k$ after removal of the stick fastening plate B, is secured to the body A in a similar manner by means of the locking lever $f$ and also has longitudinal ribs $j^1$ on its underside, the cross section of which corresponds to that of the ribs $j$ on the plate B, and which, in a similar manner to that above described, by cooperation with the longitudinal grooves $i$ in the body A, firmly clamp the wrapped over ends of the cloth $h$ and thereby enable the latter to be held in its working position.

What I claim is:—

1. In an appliance for the care of floors and stairs, the combination of a brush body, a handle fixed thereon, a removable plate above the brush body, having a slot for the passage of said handle, and locking means combined with the handle and cooperating with the plate to firmly hold said plate down onto the brush body.

2. In a stick-handled appliance for the care of floors and stairs, the combination of a brush body, a handle fixed thereon, a removable stick carrying plate above the brush body, having a slot for the passage of said handle, a supporting pin combined with the handle and a locking lever rotatably mounted on said pin, capable of being turned into alignment with the said slot for removal of the stick carrying plate or transversely thereto for securing the plate to the brush body.

3. In an appliance for the care of floors and stairs, the combination of a brush body, a handle fixed thereon, a removable cloth retaining plate above the brush body, having a slot for the passage of said handle, for clamping the upwardly turned edges of a cloth surrounding the brush body, and locking means combined with the handle and arranged to firmly hold said cloth retaining plate down onto the brush body.

4. In a stick-handled appliance for the care of floors and stairs, the combination of a brush body, a handle fixed thereon, a removable stick carrying plate above the brush body, having a slot for the passage of said handle, ribs provided on the underside of said stick carrying plate and arranged to engage corresponding grooves in the brush body for positioning and clamping the upwardly turned edges of a cloth surrounding the brush body, and locking means combined with the handle and cooperating with the plate to firmly hold said plate down onto the brush body.

5. In an appliance for the care of floors and stairs, the combination of a body, a grasp handle fixed thereon, a removable cloth retaining plate having a slot for the passage of said handle and provided with positioning means to engage corresponding positioning means on the brush body for clamping the upwardly turned edges of a cloth surrounding the brush body, and locking means combined with said handle and arranged to firmly hold the cloth retaining plate down onto the brush body.

6. In a stick-handled appliance for the care of floors and stairs, the combination of a brush body, a handle fixed thereon, a removable stick carrying plate above the brush body, having a slot for the passage of said handle, a supporting pin combined with the handle, a locking lever rotatably mounted on said pin, capable of being turned into alignment with the said slot for removal of the stick carrying plate or transversely thereto for securing the plate to the brush body, stop means on said plate for said locking lever and spring means around the pin and below the lever for sustaining the lever on the supporting pin.

7. In a stick-handled appliance for the care of floors and stairs, the combination of a brush body, a handle fixed thereon, a removable stick carrying plate above the brush body, having a slot for the passage of said handle, a supporting pin combined with the handle and a locking lever rotatably mounted on said pin, capable of being turned into alignment with the said slot for removal of the stick carrying plate or transversely thereto for securing the plate to the brush body, two sloping projections being provided on the said plate for allowing the locking lever to slide thereon when being turned into locking position, for the purpose of exerting a clamping pressure on said plate.

MAX PLÖN.